United States Patent [19]

DeLiso et al.

[11] Patent Number: 4,581,295
[45] Date of Patent: Apr. 8, 1986

[54] REFRACTORY ASSEMBLY FOR CONTAINMENT OF MOLTEN AL-LI ALLOYS

[75] Inventors: Evelyn M. DeLiso, Highland Park, N.J.; Frankie E. Phelps, Lower Burrell, Pa.; Robert A. Gilbert, New Kensington, Pa.; Douglas G. Graham, Allegheny Township, Allegheny County, Pa.; Ronald A. Kois, Tarentun, Pa.; Thomas L. Francis, Murrysville, Pa.

[73] Assignee: Aluminum Company of America, Pittsburgh, Pa.

[21] Appl. No.: 719,557

[22] Filed: Apr. 3, 1985

Related U.S. Application Data

[63] Continuation-in-part of Ser. No. 589,138, Mar. 13, 1984, Pat. No. 4,517,037, which is a continuation-in-part of Ser. No. 316,810, Nov. 2, 1981, abandoned.

[51] Int. Cl.⁴ .................... B32B 18/00; C04B 35/56; C04B 35/58; C04B 37/00
[52] U.S. Cl. ..................... 428/446; 156/89; 428/698; 501/92; 501/97; 501/98; 501/133; 501/154
[58] Field of Search ............ 501/92, 97, 98, 133, 501/154; 156/189; 428/446, 698

[56] References Cited

U.S. PATENT DOCUMENTS

| | | | |
|---|---|---|---|
| 3,093,087 | 6/1963 | Hansen | 501/92 |
| 3,291,623 | 12/1966 | Saunders et al. | 501/92 |
| 3,920,578 | 11/1975 | Yates | 501/133 |
| 4,517,037 | 5/1985 | Francis et al. | 156/89 |
| 4,533,644 | 8/1985 | Jones | 428/698 |

FOREIGN PATENT DOCUMENTS

| | | | |
|---|---|---|---|
| 58-91083 | 5/1983 | Japan | 501/92 |
| 58-84914 | 5/1983 | Japan | 501/107 |
| 1510310 | 5/1978 | United Kingdom | 156/89 |

OTHER PUBLICATIONS

Singh, R. N. "Compatibility of Ceramics with Liquid Na and Li", 59 *Journal of the American Ceramic Society*, No. 3-4, 1976, pp. 112–115.

Tuohig, W. D. et al, "Materials Studies in Support of Liquid Metal MHD Systems", *Argonne National Laboratory III Eng. Aspects of Magnetohydrodyanm. Symp.*, 1974, pp. 14.IV.10.1–IV.10.3.

Smith, D. L. et al, "Influence of Nonmetallic Impurity Elements on the Compatibility of Liquid Lithium with Potential CTR Containment Materials", 22 *Nuclear Tech.* 1974, pp. 392–404.

*Primary Examiner*—Helen M. McCarthy
*Attorney, Agent, or Firm*—Glenn E. Klepac

[57] ABSTRACT

A refractory assembly for containment of molten aluminum-lithium alloys, comprising a nitride bonded silicon carbide refractory brick and a seam joined to the brick. The seam is formed from a mortar mix comprising particulate nitride refractory filler and colloidal sol binder. The brick and seam both exhibit good resistance to attack by molten aluminum-lithium alloys at elevated temperatures.

14 Claims, 4 Drawing Figures

REFRACTORY ASSEMBLY FOR CONTAINMENT OF MOLTEN AL-LI ALLOYS

CROSS-REFERENCE TO RELATED APPLICATIONS

This application is a continuation-in-part of U.S application Ser. No. 589,138, filed Mar. 13, 1984, U.S. Pat. No. 4,517,037, which is a continuation-in-part of U.S. application Ser. No. 316,810, filed Nov. 2, 1981 and abandoned on Mar. 13, 1984.

BACKGROUND OF THE INVENTION

The present invention relates to a refractory assembly that is suitable for containment of molten aluminum-lithium alloys.

Molten aluminum-lithium alloys are extremely corrosive to most oxide-containing refractory materials at elevated temperatures because of the presence of lithium. Singh has reported that all of several oxide ceramics he tested were incompatible with liquid lithium at temperatures of 300° to 1700° K. with the oxygen level at 1 ppm or less in lithium. Some oxide ceramics ($ThO_2$, BeO, $Y_2O_3$, and MgO) were found compatible with liquid lithium only if the oxygen level in lithium is higher than $10^3$ ppm. See Singh, "Compatibility of ceramics with liquid Na and Li", 59 *J. Am. Cer. Soc.* No. 3-4, pages 112-115 (1976). With aluminum-lithium alloys assuming an increasingly important commercial role in recent years, there has developed an urgent need for refractory materials that are compatible with such alloys in the molten state.

A hostile environment is often present in apparatus that is used to smelt and refine molten metals. In such applications, the mortar in the apparatus must be resistant to attack from a wide variety of molten salts, slags, metals, gases and vapors emanating from molten metal and by-products of the smelting and refining process.

It is a principal object of the present invention to provide a refractory assembly that is suitable for containment of molten aluminum-lithium alloys. The term "refractory assembly" refers to an assembly that includes at least one brick made of a refractory material and a seam joined to such brick. Refractory assemblies typically are components of melting furnaces, metal treatment furnaces, crucibles for holding molten metal and other apparatus contacting molten metal at elevated temperatures.

It is a related object of the invention to provide both a brick and a mortar that are resistant to the corrosive effects of molten aluminum-lithium alloys.

A further object of the invention is to provide a mortar that exhibits good refractory properties, is susceptible to application by troweling, and has good bonding and adhesive characteristics with the brick.

Additional objects and advantages of the present invention will become apparent to persons skilled in the art from the following detailed specification and claims.

SUMMARY OF THE INVENTION

In accordance with the present invention, there is provided a refractory assembly that is suitable for containment of molten aluminum-lithium alloys. The assembly includes a refractory brick and a seam joined to the brick.

The refractory brick is a nitride bonded silicon carbide refractory material comprising about 80 to 95 wt % silicon carbide and about 3 to 20 wt % of a nitride bonding agent dispersed throughout the silicon carbide, the bonding agent being silicon nitride, silicon oxynitride or a mixture of silicon nitride and silicon oxynitride. The bonding agent preferably comprises about 5 to 15 wt % silicon nitride.

The seam joined to the brick is formed by applying a mortar mix and then firing at an elevated temperature. The mortar mix comprises a particulate nitride filler and a colloidal sol binder. The filler comprises about 50 to 85 wt % of the mix and is selected from the group consisting of silicon nitride, silicon oxynitride, silicon aluminum oxynitride wherein the aluminum and oxygen are in a solid solution of silicon nitride (SiAlON), and mixtures thereof. SiAlON is an acronym for material found in the Si-Al-O-N system and more specifically in the $Si_3N_4$-$AlN$-$Al_2O_3$-$SiO_2$ system. Rather than a single compound, the term SiAlON represents a range of compositions found in this system.

One example of a single phase SiAlON material and the method of making it are disclosed in Jack et al U.S. Pat. No. 3,991,166. The SiAlON material disclosed therein has the general formula $Si_{6-z}Al_zO_zN_{8-z}$ wherein z is greater than zero and less than or equal to 5. The various compositions which result from making SiAlON within the bounds of this general formula have a crystalline structure similar to beta-$Si_3N_4$ and are consequently identified as beta'-SiAlON.

Up to about 20 wt % boron nitride may optionally be added to the filler in order to make the composition non-wetting with respect to molten metal.

The colloidal sol binder comprises an aqueous suspension of binder solids which are selected from the group consisting of silica, silicon nitride, silicon oxynitride and silicon aluminum oxynitride wherein the aluminum and oxygen are in a solid solution of silicon nitride (SiAlON). The quantity of binder and the concentration of binder solids in the suspension are sufficient to coat substantially all of the filler particles and to form a plastic mixture when mixed with the filler. The term "plastic mixture" refers to a mixture that is capable of being spread with a trowel or molded. The binder typically comprises about 20 to 50 wt % solids and a particularly preferred binder comprises about 40 wt % silica solids.

The mortar mix is formed by mixing about 50 to 85 wt % of the nitride filler with about 15 to 50 wt % of the binder. Mixes containing about 55 to 85 wt % of the filler and about 15 to 45 wt % of the binder are preferred.

The mortar mix preferably contains less than about 2 wt % of the oxides or hydroxides of magnesium, calcium, chromium and manganese. In addition, the mix should contain less than about 10 wt % of the oxides or hydroxides of aluminum and titanium. These oxides and hydroxides are optimally maintained in as low a concentration as possible in order to enhance resistance of the composition to corrosion by molten metal at elevated temperatures.

The mortar mix may further include about 0.1 to 15 wt % fumed silica in order to provide intermediate particles in spaces between the particulate nitride refractory filler. Fumed silica is silicon dioxide having a particle size range of about 0.01-0.40 microns. It is additionally characterized as being a generally spherical shaped amorphous silica.

The mortar mix described above is applied as a layer onto refractory bricks which are then combined to form an assembly having the mortar mix as a seam or joint. The assembly is allowed to dry for 24 hours and is then aged to harden the seam. The assembly is preferably fired at an elevated temperature of about 750°–850° C. to convert the mortar and brick into a finished refractory assembly. A preferred firing temperature is about 816° C.

DETAILED DESCRIPTION OF THE PREFERRED EMBODIMENTS

Figure 1:
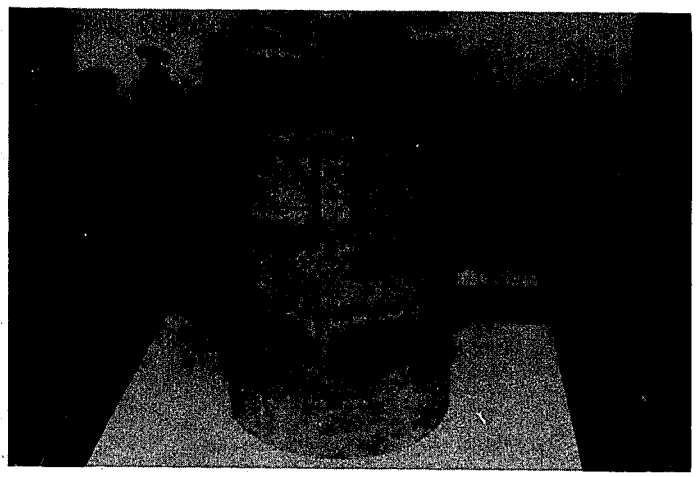
FIG. 1 is a photograph of the crucible tested in Example 2 prior to testing.

The refractory brick of the invention is a nitride bonded silicon carbide refractory brick. A nitride bonded silicon carbide refractory body and a method for making such body are disclosed in Saunders et al U.S. Pat. No. 3,291,623 issued Dec. 13, 1966. The disclosure of said Saunders et al patent is incorporated herein to the extent not inconsistent with the present invention.

A particularly preferred nitride bonded silicon carbide refractory brick is sold commercially under the trade name REFRAX 50. This REFRAX 50 brick is sold by The Carborundum Company of Keasbey, N.J. The following is a typical chemical analysis of the nitride bonded silicon carbide refractory brick.

TABLE 1

| Typical Chemical Analysis of Brick | |
|---|---|
| Compound | Composition (wt %) |
| SiC | 85.4 |
| $Si_3N_4$ | 11.4 |
| $SiO_2$ | 1.3 |
| Si | 0.2 |
| $Al_2O_3$ | 0.6 |
| $Fe_2O_3$ | 0.7 |
| CaO | 0.3 |
| Other | 0.1 |
| TOTAL | 100.0 |

A preferred mortar mix of the invention comprises a nitride refractory filler of silicon oxynitride, SiAlON, silicon nitride or combinations thereof and a colloidal sol binder material. This mix is described in Francis et al U.S. Pat. application Ser. No. 589,138, filed Mar. 13, 1984. The disclosure of said Francis et al patent application is incorporated herein to the extent not inconsistent with the present invention.

The particle size of the filler may vary over a broad range depending upon desired characteristics of the mortar. Larger particle sizes provide a mortar with better shrinkage properties and a better resistance to the effect of thermal shock, for example, than a mortar made of small particles. Larger particle sizes, on the other hand, provide a more porous structure in the mortar upon firing and make the resultant refractory less resistant to penetration by the elements of a hostile environment than if the mortar is comprised of smaller particles.

A preferred colloidal sol binder material is colloidal silica. This material is supplied in aqueous suspensions with various concentrations of silica ranging up to about 50 wt % solids. A preferred colloidal suspension has a 40 wt % $SiO_2$ concentration. The amount of colloidal sol binder is chosen such that it is effective to bind essentially all of the refractory filler particles together into a plastic mixture.

In general, the amount of binder required is a function of surface area of the filler particles. The amount of binder material needed can be determined without undue experimentation, by varying the amount of binder in relation to the filler materials and exposing test specimens made from various compositions to a particular hostile environment. After exposure, the test specimens are observed visually for evidence of corrosive attack, mechanical failure such as cracking, or subjected to a boiling water test as a measure of adhesion.

In preparing a sample mortar mixture for testing, filler material was crushed and then ground to pass through a 48 mesh screen (Tyler Series). A particle size of less than 48 mesh is preferred in order to provide a mortar that is relatively non-porous after firing when installed in a chemically hostile environment. A typical particle size distribution of the crushed and ground filler material is shown in Table 2.

TABLE 2

| Filler Particle Size Distribution | |
|---|---|
| Screen Size (mesh) | Proportion (wt %) |
| −48 + 65 | 26.3 |
| −65 + 100 | 19.1 |
| −100 + 200 | 23.5 |
| −200 + 325 | 15.9 |
| −325 | 15.2 |

An additional amount of filler material may be provided in a superground powder form, i.e. particle size of less than 325 mesh, with as much as 99 wt % of the superground powder below 400 mesh. Such superground component was provided, for example, by ball milling for 16 hours a portion of the aforementioned ground material in a ceramic mill of 4.3 liters capacity operating at 70 rpm. The milling media was 99% alumina balls and 0.5% ethylene glycol by weight of material to be ground. The superground material having a typical median particle size of about 2.1 microns fills voids between the −48 mesh material and increases the surface or bonding area of the filler material.

The mortar composition may further include fumed silica to provide an intermediate particle in spaces between the nitride refractory filler particles. Fumed silica is silicon dioxide having a particle size range of about 0.01–0.40 microns. It is additionally characterized as being a generally spherical shaped amorphous silica. In Example 2, the ground and superground filler materials as described above were dry blended with fumed silica prior to mixing with a colloidal sol silica binder. Compositions of mortar mixes that were tested are listed in Table 3.

TABLE 3

| | Mortar Composition (wt %) | | | |
|---|---|---|---|---|
| Example | Filler Type | −48 Mesh Aggregate | Superground Powder | Fumed Silica | Binder |
| 1 | $Si_2ON_2$ | 59.0 | — | — | 41.0 |
| 2 | SiAlON | 64.1 | 16.1 | 3.3 | 16.5 |

Refractory assemblies of the invention were tested by preparing experimental crucibles with nitride bonded silicon carbide bricks and the mortar mixes of Examples 1 and 2. The crucible bricks were cut and shaped from standard 9 inch brick in a manner to leave a 4 inch square cavity, 12 inches deep. The bricks were laid to form a crucible which was then dried for 24 hours and fired at 816° C. The crucible of Example 2 is shown in FIG. 1.

An aluminum-lithium alloy material was prepared by alloying aluminum with 3 wt % Li, 2 wt % Mg, and 1 wt % Cu. Metal alloy test specimens were prepared by melting aluminum in the crucibles and then alloying with lithium, magnesium and copper. As used herein the term "aluminum-lithium alloy" refers to compositions containing predominantly aluminum and about 1–10 wt % lithium, preferably about 2–4.5 wt % Li with minor additions of magnesium and copper.

A refractory lid was placed on the crucible and argon was injected through it to maintain an inert atmosphere. The crucible of Example 1 was maintained at 760° C. for 27 days, and the crucible of Example 2 was kept at the same temperature for 18 days. For the duration of each test, the metal was stirred, skim removed, and a sample taken daily for analysis. Additional metal was added to make up for skim and samples removed.

Figure 4:
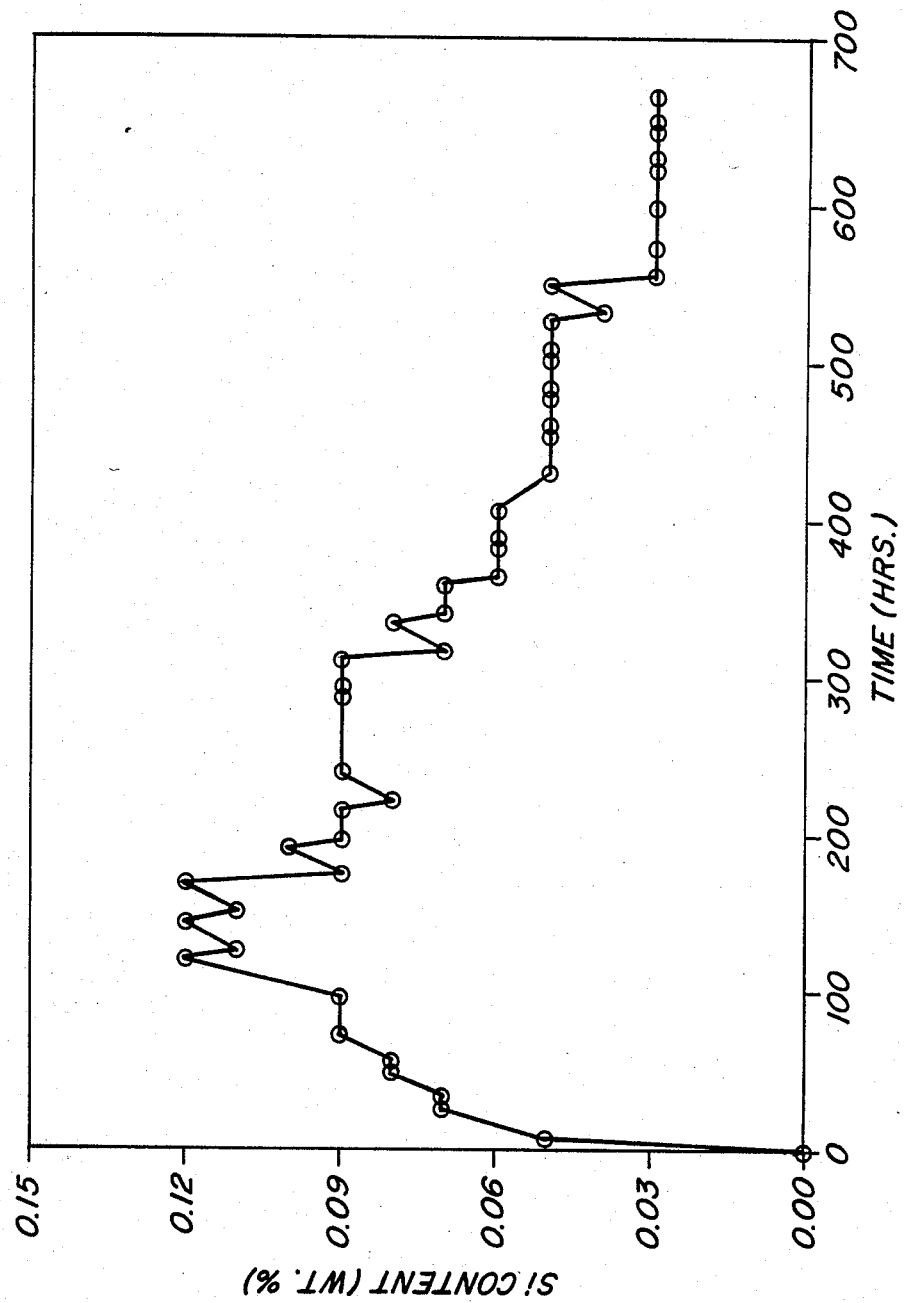
FIG. 4 is a graph of silicon content in the metal of Example 1 as a function of time.

FIG. 4 is a graph of silicon pickup in the Example 1 aluminum-lithium alloy test material as a function of time. Silicon pickup in the metal reached a peak of about 0.12 wt % after 100 hours and then declined to about 0.03 wt %. This pattern suggests that while small particles of the seam may have initially broken off from the assembly and dissolved in the metal, the seam is chemically stable with respect to aluminum-lithium alloys. Iron pickup, which was attributed to the tools used during the test, rose to 0.05 wt % after 475 hours of exposure and then dropped off to 0.04 wt %. Similarly, in Example 2, the pickup of silicon reached a maximum of 0.05 wt % and for iron it reached a maximum of 0.04 wt % over the span of the test.

Figure 2:
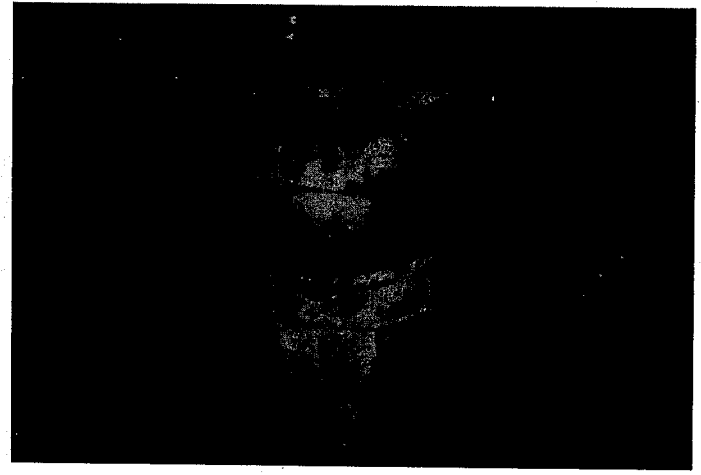
FIG. 2 is a photograph of the crucible tested in Example 2 after testing.
Figure 3:
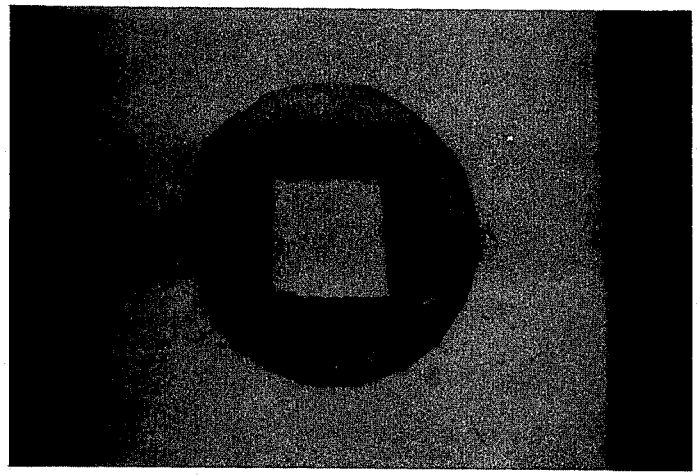
FIG. 3 is a photograph of a horizontal cross-section of the crucible of FIG. 2.

Upon completion of the tests, both crucibles were autopsied. FIG. 2 is a photograph of the Example 2 crucible after testing. In both tests, the brick showed virtually no evidence of attack by the metal. The seams showed some discoloration but had to be physically broken apart, suggesting that adhesion of the mortar to the bricks had not deteriorated. FIG. 3 is a photograph of one of several horizontal slices or cross-sections taken from the Example 2 crucible after testing. As shown in FIG. 3, the metal did not penetrate into joints between the bricks.

While our invention has been described in terms of two particularly preferred embodiments, the claims appended hereto are intended to encompass all embodiments which fall within the spirit of the invention.

What is claimed is:

1. A refractory assembly suitable for containment of molten aluminum-lithium alloys, comprising
   (a) a refractory brick comprising
      (i) about 80 to 95 wt % silicon carbide, and
      (ii) about 3 to 20 wt % of a nitride bonding agent dispersed throughout said silicon carbide, said bonding agent being selected from the group consisting of silicon nitride, silicon oxynitride and mixtures thereof, and
   (b) a seam joined to said brick, said seam comprising a mortar mix applied to said brick and then fired at an elevated temperature, said mortar mix comprising
      (i) about 50 to 85 wt % of a particulate nitride refractory filler selected from the group consisting of silicon nitride, silicon oxynitride, silicon aluminum oxynitride wherein the aluminum and oxygen are in a solid solution of silicon nitride, and mixtures thereof,
      (ii) about 15 to 50 wt % of a colloidal sol binder comprising an aqueous suspension of binder solids selected from the group consisting of silica, silicon nitride, silicon oxynitride and silicon aluminum oxynitride wherein the aluminum and oxygen are in a solid solution of silicon nitride, the quantity of binder and the concentration of binder solids in said suspension being sufficient to coat substantially all of the particulate filler and to form a plastic mixture therewith, and
      (iii) less than about 2 wt % of the oxides or hydroxides of magnesium, calcium, chromium and manganese.

2. The refractory assembly of claim 1 wherein said brick comprises about 5 to 15 wt % of the bonding agent.

3. The refractory assembly of claim 2 wherein said bonding agent comprises silicon nitride.

4. The refractory assembly of claim 1 wherein said filler in the mortar mix comprises silicon oxynitride.

5. The refractory assembly of claim 1 wherein said filler in the mortar mix comprises silicon aluminum oxynitride wherein the aluminum and oxygen are in a solid solution of silicon nitride.

6. The refractory assembly of claim 1 wherein substantially all of said filler in the mortar mix passes through a 48 mesh screen (Tyler Series).

7. The refractory assembly of claim 1 wherein said binder comprises about 25 to 50 wt % solids.

8. The refractory assembly of claim 1 wherein said assembly has been fired at a temperature of about 750° to 850° C.

9. The refractory assembly of claim 1 wherein said mortar mix further comprises
   (iv) about 0.1 to 15 wt % of fumed silica.

10. The refractory assembly of claim 1 wherein said mortar mix comprises less than about 10 wt % of the oxides or hydroxides of aluminum and titanium.

11. A method for making a refractory assembly comprising the steps of
   (a) preparing a mortar mix comprising
      (i) about 50 to 85 wt % of a particulate nitride refractory filler selected from the group consisting of silicon nitride, silicon oxynitride, silicon aluminum oxynitride wherein the aluminum and oxygen are in a solid solution of silicon nitride, and mixtures thereof,
      (ii) about 15 to 50 wt % of a colloidal sol binder comprising an aqueous suspension of binder solids selected from the group consisting of silica, silicon oxynitride, silicon nitride and silicon aluminum oxynitride wherein the aluminum and oxygen are in a solid solution of silicon nitride, the quantity of binder and the concentration of binder solids in said suspension being sufficient to coat substantially all of the particulate filler and to form a plastic mixture therewith, and
      (iii) less than about 2 wt % of the oxides or hydroxides of magnesium, calcium, chromium and manganese:
   (b) applying the mortar mix to form a seam between a pair of opposed refractory bricks each comprising
      (i) about 80 to 95 wt % silicon carbide, and (ii) about 3 to 20 wt % of a nitride bonding agent dispersed throughout said silicon carbide, said bonding agent being selected from the group consisting of silicon nitride, silicon oxynitride and mixtures thereof, said seam and bricks comprising, in combination, a refractory assembly.

12. The method of claim 11, further comprising
(c) aging the refractory assembly to harden the seam.

13. The method of claim 12 wherein step (c) is performed at an elevated temperature.

14. The method of claim 12 wherein step (c) is performed at 750° to 850° C.

* * * * *